(12) United States Patent
Al-Yassir et al.

(10) Patent No.: US 10,195,604 B2
(45) Date of Patent: Feb. 5, 2019

(54) MODIFIED ZEOLITE CATALYST AND METHODS FOR PRODUCING AND USING SAME

(71) Applicant: SAUDI BASIC INDUSTRIES CORPORATION, Riyadh (SA)

(72) Inventors: Nabil Al-Yassir, Dhahran (SA); Mohammed Al-Hazmi, Riyadh (SA); Mohammed Abdul Bari Siddiqui, Dhahran (SA); Yaming Jin, Riyadh (SA); Abdullah Aitani, Dhahran (SA); Sulaiman Al-Khattaf, Dhahran (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/888,043

(22) PCT Filed: May 8, 2014

(86) PCT No.: PCT/IB2014/061309
§ 371 (c)(1),
(2) Date: Oct. 29, 2015

(87) PCT Pub. No.: WO2014/181293
PCT Pub. Date: Nov. 13, 2014

(65) Prior Publication Data
US 2016/0107153 A1    Apr. 21, 2016

Related U.S. Application Data

(60) Provisional application No. 61/821,945, filed on May 10, 2013.

(51) Int. Cl.
| | | |
|---|---|---|
| *B01J 37/06* | (2006.01) | |
| *B01J 29/06* | (2006.01) | |
| *B01J 37/30* | (2006.01) | |
| *C10G 11/05* | (2006.01) | |
| *B01J 29/064* | (2006.01) | |
| *B01J 29/068* | (2006.01) | |
| *B01J 29/072* | (2006.01) | |
| *B01J 29/076* | (2006.01) | |
| *B01J 29/40* | (2006.01) | |
| *B01J 29/42* | (2006.01) | |
| *B01J 29/44* | (2006.01) | |
| *B01J 29/46* | (2006.01) | |
| *B01J 29/48* | (2006.01) | |
| *B01J 29/89* | (2006.01) | |
| *B01J 37/02* | (2006.01) | |
| *C10G 35/095* | (2006.01) | |
| *C10G 45/68* | (2006.01) | |

(52) U.S. Cl.
CPC .......... *B01J 37/06* (2013.01); *B01J 29/061* (2013.01); *B01J 29/064* (2013.01); *B01J 29/068* (2013.01); *B01J 29/072* (2013.01); *B01J 29/076* (2013.01); *B01J 29/405* (2013.01); *B01J 29/42* (2013.01); *B01J 29/44* (2013.01); *B01J 29/46* (2013.01); *B01J 29/48* (2013.01); *B01J 29/89* (2013.01); *B01J 37/0201* (2013.01); *B01J 37/0203* (2013.01); *B01J 37/30* (2013.01); *C10G 11/05* (2013.01); *C10G 35/095* (2013.01); *C10G 45/68* (2013.01); *B01J 2229/16* (2013.01); *B01J 2229/18* (2013.01); *B01J 2229/183* (2013.01); *B01J 2229/186* (2013.01); *B01J 2229/38* (2013.01); *C10G 2400/20* (2013.01); *C10G 2400/30* (2013.01)

(58) Field of Classification Search
CPC ........................................................ B01J 37/06
See application file for complete search history.

(56) References Cited

U.S. PATENT DOCUMENTS

| | | | | |
|---|---|---|---|---|
| 3,326,797 A | * | 6/1967 | Young | B01J 20/186 208/111.35 |
| 5,015,785 A | * | 5/1991 | Steck | C07C 37/00 568/716 |
| 5,118,482 A | * | 6/1992 | Narayana | B01J 20/186 423/713 |
| 5,308,813 A | * | 5/1994 | Vaughan | B01J 29/04 502/208 |
| 2005/0187394 A1 | * | 8/2005 | Dessau | B01J 29/89 549/533 |
| 2016/0017238 A1 | * | 1/2016 | Stamires | C10G 3/49 585/469 |

FOREIGN PATENT DOCUMENTS

| | | |
|---|---|---|
| CN | 101588866 A | 11/2009 |
| EP | 2269734 A1 | 1/2011 |
| EP | 2269734 * | 5/2011 |

(Continued)

OTHER PUBLICATIONS

Caicedo-Realpe et al, "Mesoporous ZSM-5 zeolites prepared by a two-step route comprising sodium aluminate and acid treatments," Microporous and Mesoporous Materials 128 (2010) 91-100.

(Continued)

*Primary Examiner* — Douglas B Call
(74) *Attorney, Agent, or Firm* — Cantor Colburn LLP

(57) ABSTRACT

The invention pertains to a zeolite catalyst, methods of making same, and its use in the catalytic cracking of naphtha for the production of lower molecular weight olefins and alkanes, while minimizing production less desirable products. A zeolite is modified by base leaching and by the addition of a metal cation, thereby lowering the Si/Al$_2$ ratio and improving the stability of the formed catalyst.

20 Claims, 3 Drawing Sheets

(56) References Cited

FOREIGN PATENT DOCUMENTS

| WO | 2012068645 A2 | | 5/2012 |
|---|---|---|---|
| WO | 2013060705 A2 | | 5/2013 |
| WO | WO 2013/123299 | * | 8/2013 |

OTHER PUBLICATIONS

International Search Report for International Application No. PCT/IB2014/061309; International Filing Date: May 8, 2014; dated Jul. 30, 2014; 8 Pages.

Le Van Mao et al, "Enhanced Catalytic Performances by Desilication and Subsequent Steam Treatment of ZSM-5 Zeolite," Mat. Res. Soc. Symp. Proc. vol. 454 (1997) pp. 73-78.

Li et al., "Interaction of titanium and iron oxide with ZSM-5 to tune the catalytic cracking of hydrocarbons," Applied Catalysis A: General 375 (2010) 222-229.

Melian-Cabrera et al., "Alkaline leaching for synthesis of improved Fe-ZSM5 catalysts," Catalysis Communications 7 (2006) 100-103.

Nandiwale et al., "Catalytic upgrading of renewable levulinic acid to ethyl levulinate biodiesel using dodecatungstophosphoric acid supported on dsilicated H-ZSM-5 as catalyst," Applied Catalysis A: General 460-461 (2013) 90-98.

Rahimi et al., "Catalytic cracking of hydrocarbons over modified ZSM-5 zeolites to produce light olefins: A review," Applied Catalysis A: General 398 (2011) 1-17.

Rahman et al., "Direct synthesis of formic acid by partial oxidation of methane on H-ZSM-5 solid acid catalyst," Catalysis Communications 12 (2011) pp. 1198-1200.

Sik Jung et al., "Catalytic cracking of n-octane over alkali-treated MFI zeolites," Applied Catalysis A: General 288 (2005) 149-157.

Subba Rao et al, "Titanium oxide loaded zeolites as photocatalysts for the cyclization of ethylenediamine with propylene glycol," Catalysis Letters, vol. 90, Nos. 1-2, Sep. 2003, pp. 95-102.

Written Opinion of the International Searching Authority for International Application No. PCT/IB2014/061309; International Filing Date: May 8, 2014; dated Jul. 30, 2014; 12 Pages.

Xu et al., "Postsynthesis of mesoporous MOR-type titanosilicate and its unique catalytic properties in liquid-phase oxidations," Journal of Catalysis 281 (2011) 263-272.

Zhang et al., "Research on Catalytic Performance of W-Modified HZSM-5 Catalyst for $C_4$ Olefin Cracking," Journal of Molecular Catalysis (2008) 2 Pages.

Zhou et al, "Tert-butylation of Toulene with Tert-butyl Alcohol over Realuminated H-mordentie Zeolite," Chinese Journal of Chemical Engineering 17(2) 195-199 (2009).

Chinese Patent No. 101588866(A); Date of Publication: Nov. 25, 2009; Machine Translation; 10 Pages.

* cited by examiner

MODIFIED ZEOLITE CATALYST AND METHODS FOR PRODUCING AND USING SAME

CROSS REFERENCE TO RELATED APPLICATIONS

This application is a 371 of International Application No. PCT/IB2014/061309, filed May 8, 2014, which claims priority to U.S. Patent Application No. 61/821,945, filed May 10, 2013, which are incorporated herein by reference in their entirety.

FIELD OF INVENTION

The present compositions and methods relate to modified zeolite catalyst compositions and their method of use for the catalytic cracking of naphtha.

BACKGROUND

Catalytic cracking of the refinery-derived feedstock and readily available straight run light naphtha (LSRN), is a process that is used to produce lower molecular weight hydrocarbons, particularly $C_2$-$C_3$ olefins, which are, in turn, valuable intermediates for product of other industrial chemicals and plastics. The catalysts used in the cracking process are generally of the zeolite type, which are porous aluminosilicates. The cracking process takes place when naphtha is contacted with the catalyst at a temperature sufficient to initiate the reaction. The actual products produced during the process depend on the nature of the catalyst used.

Accordingly, disclosed herein are methods for catalytic cracking naphtha that maximize the production of desirable products while minimizing less desirable products, and zeolite catalysts related thereto, and methods for the production of a modified zeolite catalyst for carrying out such methods.

SUMMARY

Disclosed herein are methods of modifying a zeolite catalyst comprising:
  providing a zeolite catalyst;
  contacting the zeolite catalyst with a first composition comprising NaOH and $Na_2CO_3$, thereby producing a leached zeolite catalyst;
  contacting the leached zeolite with a second composition comprising a realuminating agent, thereby producing a realuminated zeolite catalyst;
  modifying the provided zeolite catalyst, leached zeolite catalyst, or realuminated zeolite with one or more metal atoms or ions comprising Mg, Ba, Sr, Cr, Fe, Co, Ni, Cu, Zn, Ga, Ce, Ag, Pd, Bi, Ti, V, Zr, Mo, W, Li, or La, or a mixture thereof,
  wherein the method produces a modified zeolite catalyst.

Also disclosed herein is a modified zeolite catalyst produced by the methods disclosed herein.

Also disclosed is a method of cracking naphtha comprising contacting naphtha with the modified zeolite catalysts described herein.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects, and together with the description, serve to explain the principles of the compositions and methods disclosed herein.

DETAILED DESCRIPTION

Figure 1:
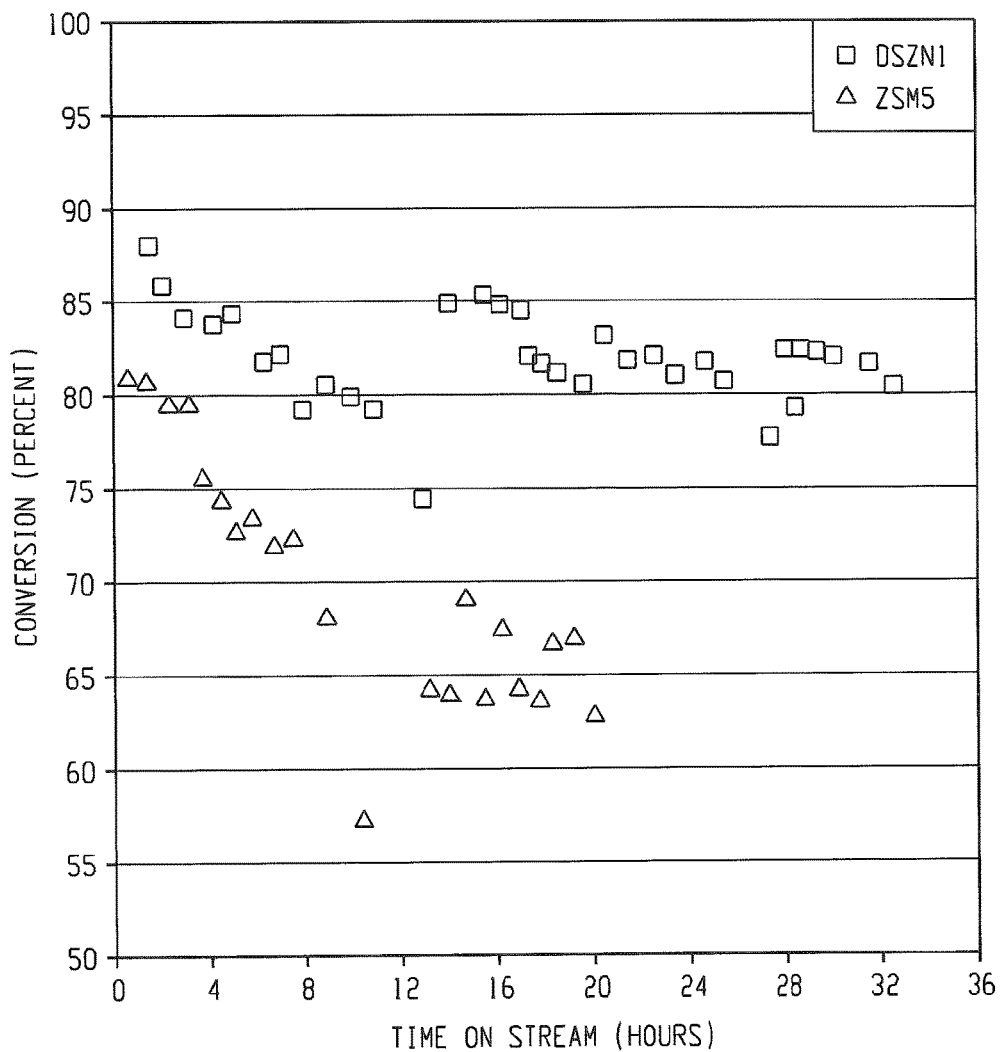
FIG. 1 shows a plot of Conversion versus Time on stream for ZSM5 ($Si/Al_2$=27) and desilicated HZSM-5 ($Si/Al_2$=27) catalysts.

The present invention can be understood more readily by reference to the following detailed description of the invention and the Examples included therein.

Definitions

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Disclosed herein are materials, compounds, compositions, and components that can be used for, can be used in conjunction with, can be used in preparation for, or are products of the disclosed method and compositions. It is to be understood that when combinations, subsets, interactions, groups, etc. of these materials are disclosed that while specific reference of each various individual and collective combinations and permutation of these compounds may not be explicitly disclosed, each is specifically contemplated and described herein. For example, if a catalyst component is disclosed and discussed, and a number of alternative solid state forms of that component are discussed, each and every combination and permutation of the catalyst component and the solid state forms that are possible are specifically contemplated unless specifically indicated to the contrary. This concept applies to all aspects of this disclosure including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims that follow, reference will be made to a number of terms which shall be defined to have the following meanings:

As used herein, nomenclature for compounds, including organic compounds, can be given using common names, IUPAC, IUBMB, or CAS recommendations for nomenclature. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and the appended claims, the singular forms "a," "an," and "the" include plural referents, unless the context clearly dictates otherwise.

When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of value is disclosed herein. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denote the weight relationship between the element or component and any other elements or components in the composition or article for which a part by weight is expressed. Thus, in a compound containing 2 parts by weight of component X and 5 parts by weight of component Y, X, and Y are present at a weight ratio of 2:5, and are present in such ratio regardless of whether additional components are contained in the compound.

A weight percent (wt %) of a component, unless specifically stated to the contrary, is based on the total weight of the formulation or composition in which the component is included.

As used herein, the terms "optional" or "optionally" mean that the subsequently described event or circumstance can or cannot occur, and that the description includes instances where said event or circumstance occurs and instances where it does not.

Many of the catalyst compositions and/or catalyst components disclosed herein are described as containing a "metal" or "metals." Examples of such "metal" components include B, La, Mn, Sb, Ti, Zr, Fe, Cs, Au, and Ce, Na, K, Mg, or Ca, and La, Te, Ge, Zn, Si, In, or W. It should be understood that references to such "metals" in this application do NOT imply a particular valence, chemical, or physical state of those elements, or that those elements are necessarily in a zero valent state, or metallic solid physical state or alloy (although they could be in such states), but rather that the term "metal" or "metals" can also be present in a compound with other elements or groups wherein the metal can be present in any energetically feasible positive oxidation state (i.e. cationic oxidation states). For example, a reference to potassium (K) as a metal could include bulk metallic potassium in a zero oxidation state, or dispersions or solutions of potassium metal, or also the cationic form $K^+$ of potassium, which may be present in either liquid or crystalline solutions with other elements.

As used herein, the term "BTX" refers to benzene, toluene and xylenes.

As used herein, the term "straight run naphtha" refers to petroleum naphtha obtained directly from fractional distillation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Methods of Preparing the Catalyst Compositions

Disclosed herein are modified zeolite catalyst compositions useful in the process of naphtha cracking.

In one aspect the inventions described herein the method of modifying a zeolite catalyst comprising:

providing a zeolite catalyst;

contacting the zeolite catalyst with a first composition comprising NaOH and $Na_2CO_3$, thereby producing a leached zeolite catalyst;

contacting the leached zeolite with a second composition comprising a realuminating agent, thereby producing a realuminated zeolite catalyst;

modifying the provided zeolite catalyst, leached zeolite catalyst, or realuminated zeolite with one or more metal atoms or ions comprising Mg, Ba, Sr, Cr, Fe, Co, Ni, Cu, Zn, Ga, Ce, Ag, Pd, Bi, Ti, V, Zr, Mo, W, Li, or La, or a mixture thereof, wherein the method produces a modified zeolite catalyst.

A. Zeolite Catalyst

Zeolites are microporous aluminosilicates that comprise $SiO_4$ and $AlO_4$ tetrahedral linked at their corners via common oxygen atoms. The overall linked tetrahedral units comprise formula units corresponding to $SiO_2$ and $AlO_2^-$ subunits, wherein one negative charge resides at each tetrahedron with an Al atom at its center. This arrangement can result in porous inorganic macromolecular solids comprising networks of channels, channel intersections, and/or cages with dimensions similar to the dimensions of organic small molecules. Inside the voids in the structures are small cations (often metallic cations, such as $Na^+$ or $K^+$ cations, or sometimes small organic ammonium cations) which compensate the negative charge of the aluminosilicate framework, but there is often extra room inside the voids for the adsorption of water or other small molecules.

As disclosed by Weitkamp, zeolites occur in many forms in nature and have been known for almost 250 years, but natural zeolites typically contain undesirable impurities and varying structures that are not well suited for catalytic applications. Naturally occurring forms are of limited value. Over the last 60 years or so, much progress has been made in the synthesis of artificial zeolites, which have much more consistent and controlled structures and much better purity, which enable them to exhibit much better activity for catalyzing chemical reactions of adsorbed molecules. Many classes and species of synthetic zeolites having catalytic activity are known to those of skill in the art, as described in the Atlas of Zeolite Framework Types, eds. Ch. Baerlocher, W. H. Meier, and D. H. Olson, Elsevier, Fifth Edition, 2001 (hereinafter referred to as "the Atlas").

It is also well known in the art that the small cations within the zeolites (as a result of typical synthetic procedures carried out under basic conditions) can be removed by ion-exchange with $NH_4^+$ ammonium cations, then the ammonium ion exchanged zeolites can be thermolyzed to liberate ammonia, leaving behind sites on the catalyst framework comprising Bronstead acidic $H^+$ cations attached to oxygen atoms in the framework, thus forming zeolites that are solid acids. In practice, a zeolite being in the hydrogen form can be quantified by experimentally showing by measurements that its sodium or potassium content is very low, for example below: 0.1, 0.05, 0.02, or 0.01 weight %.

Zeolites in the acid form typically show dramatical improvements in the rates of many reactions of small organic molecules. Zeolites also have Lewis acid sites related to aluminum sites in the zeolite lattice. However, any aluminosilicate zeolite that shows activity in converting hydrocarbons, both aliphatics and aromatics to olefins, before modifying the zeolite with the methods as disclosed herein, can be employed.

The zeolite catalysts that are provided are porous aluminosilicates and are catalysts of the pentasil type and are useful in many chemical processes. The acid form of one such catalyst ZSM-5, denoted as HZSM-5, has been widely used and is commercially available in various Si/Al ratios. Samples can be supplied by e.g., Zeolyst International, Business Office and R&D Center, 280 Cedar Grove Road, Conshohocken, Pa. 19428-2240 USA. Its preparation has also been described by A. K. M. L. Rahman et al, Catal. Commun. 12 (2011)1198-1200. It is a very common catalyst for many commercial processes and it is relatively cheap compared to other catalysts used for methane oxidation. HZSM-5 has many physical and chemical advantageous properties. In particular, it is a very stable catalyst and versatile catalyst that can be modified to enhance its performance.

In one aspect, the aluminosilicate zeolites can be characterized by the $Si/Al_2$ molecular or atomic ratio of their framework. This ratio can vary widely in the catalyst composition used in accordance to the invention. In some aspects, the $Si/Al_2$ ratio is from 5 to 1000, or from 20 to 500, or from 25 to 300. In another aspect, the $Si/Al_2$ ratio is 27.

The pore size of the zeolite is not specifically critical, and can be of small, medium or large size; according to the classifications generally used in the art. In some aspects, the pores are of medium size, which means the pores are from 5 Å to 7 Å, but in other aspects, 5-6 Å. In some aspects, the zeolites have pores comprising 10 silicon or aluminum based tetrahedral, units, i.e. a 10-ring structure.

Examples of suitable zeolite materials include the ZSM-series, beta aluminosilicate, or mixtures thereof. Suitable zeolite materials, include but are not limited to, ZSM-5, ZSM-8, ZSM-11, ZSM-12, ZSM-22, ZSM-23, ZSM-35, ZSM-38, ZSM-48 and ZSM-57, in their acid forms optionally designated by the addition of "H" to the acronym, which comprise Bronsted acid sites. In one aspect, the zeolite material is ZSM-5, ZSM-11, ZSM-23, ZSM-48 and ZSM-57 and their respective acid forms. In one aspect, the zeolite can be in its acid form. In yet another aspect, the zeolite can be HZSM-5.

B. Contacting the Zeolite Catalyst with a First Composition Comprising NaOH and $Na_2CO_3$, Thereby Producing a Leached Zeolite Catalyst Contacting the zeolite catalyst with a first composition comprising NaOH and $Na_2CO_3$ desilicates (leaches) the zeolite of Si. Accordingly, a leached zeolite catalyst generally has a lower Si content than the provide catalyst.

In one aspect, the first composition comprises from 0.001 to 1 M NaOH. In another aspect, the first composition comprises from 0.01 to 0.5 M NaOH. In yet another aspect, the first composition comprises from 0.01 to 0.3 M NaOH. In yet another aspect, the first composition comprises from 0.01 to 0.1 M NaOH. In yet another aspect, the first composition comprises from 0.01 to 0.05 M NaOH. In yet another aspect, the first composition comprises from 0.01 to 0.03 M NaOH.

In one aspect, the first composition comprises from 0.001 to 10 M $NaCO_3$. In another aspect, the first composition comprises from 0.1 to 5 M $NaCO_3$. In yet another aspect, the first composition comprises from 0.3 to 3 M $NaCO_3$. In yet another aspect, the first composition comprises from 0.5 to 1 M NaCO$_3$. In yet another aspect, the first composition comprises from 0.7 to 0.9 M NaCO$_3$. In yet another aspect, the first composition comprises from 0.75 to 0.85 M NaCO$_3$.

In one aspect, the first composition comprises from 0.001 to 1 M NaOH and from 0.001 to 10 M NaCO$_3$. In another aspect, the first composition comprises from 0.01 to 0.5 M NaOH and from 0.1 to 5 M NaCO$_3$. In yet another aspect, the first composition comprises from 0.01 to 0.3 M NaOH and from 0.3 to 3 M NaCO$_3$. In yet another aspect, the first composition comprises from 0.01 to 0.1 M NaOH and from 0.5 to 1 M NaCO$_3$. In yet another aspect, the first composition comprises from 0.01 to 0.05 M NaOH and from 0.7 to 0.9 M NaCO$_3$. In yet another aspect, the first composition comprises from 0.01 to 0.03 M NaOH and from 0.75 to 0.85 M NaCO$_3$.

In one aspect, contacting the zeolite catalyst with a first composition comprising NaOH and Na$_2$CO$_3$, thereby producing a leached zeolite catalyst is carried out at a temperature from 40° C. to 140° C. In another aspect, contacting the zeolite catalyst with a first composition comprising NaOH and Na$_2$CO$_3$, thereby producing a leached zeolite catalyst is carried out at a temperature from 60° C. to 120° C. In yet another aspect, contacting the zeolite catalyst with a first composition comprising NaOH and Na$_2$CO$_3$, thereby producing a leached zeolite catalyst is carried out at a temperature from 80° C. to 120° C. In yet another aspect, contacting the zeolite catalyst with a first composition comprising NaOH and Na$_2$CO$_3$, thereby producing a leached zeolite catalyst is carried out at a temperature from 90° C. to 110° C. In yet another aspect, contacting the zeolite catalyst with a first composition comprising NaOH and Na$_2$CO$_3$, thereby producing a leached zeolite catalyst is carried out at a temperature from 50° C. to 90° C. In yet another aspect, contacting the zeolite catalyst with a first composition comprising NaOH and Na$_2$CO$_3$, thereby producing a leached zeolite catalyst is carried out at a temperature from 70° C. to 90° C.

In one aspect, contacting the zeolite catalyst with a first composition comprising NaOH and Na$_2$CO$_3$, thereby producing a leached zeolite catalyst is carried out for at least 0.5 h. In yet another aspect, contacting the zeolite catalyst with a first composition comprising NaOH and Na$_2$CO$_3$, thereby producing a leached zeolite catalyst is carried out for at least 1.5 h. In yet another aspect, contacting the zeolite catalyst with a first composition comprising NaOH and Na$_2$CO$_3$, thereby producing a leached zeolite catalyst is carried out between 0.25 h and 4 h. In yet another aspect, contacting the zeolite catalyst with a first composition comprising NaOH and Na$_2$CO$_3$, thereby producing a leached zeolite catalyst is carried out between 0.5 h and 2 h.

In one aspect, the leached zeolite catalyst has a Si/Al$_2$ from 23 to 27. In another aspect, the leached zeolite catalyst has a Si/Al$_2$ from 23 to 26. In yet another aspect, the leached zeolite catalyst has a Si/Al$_2$ from 23 to 25.

In one aspect, the leached zeolite catalyst can be dried. In another aspect, the leached zeolite catalyst is washed and allowed to dry. Washing of the dried powder with an aqueous solution of an ammonium salt such as ammonium nitrate, ammonium chloride, or ammonium sulfate, followed by calcination to convert the NH$_4$-form zeolite to the H form. To insure complete conversion, this ion exchange step can be repeated.

C. Contacting the Leached Zeolite with a Second Composition Comprising a Realuminating Agent, Thereby Producing a Realuminated Zeolite Catalyst The amount of aluminum present in the leached zeolite catalyst can be increased by contacting the leached zeolite catalyst with a composition comprising a realuminating agent. This step increases the aluminum content in the zeolite catalyst, and, thus, produces a realuminated zeolite catalyst.

In one aspect, the realuminating agent comprises sodium aluminate (NaAlO$_2$), potassium aluminate (KAlO$_2$), aluminum sulfate, aluminum chloride, aluminum chlorohydrate, aluminum nitrate, and/or the like. In another aspect, the realuminating agent comprises NaAlO$_2$. In yet another aspect, the realuminating agent comprises KAlO$_2$. In yet another aspect, the realuminating agent comprises aluminum sulfate.

In one aspect, the second composition comprises from 0.1 mmolM to 20 mmol of the realuminating agent. In another aspect, the second composition comprises from 1 mmol to 10 mmol of the realuminating agent.

D. Modifying the Provided Zeolite Catalyst, Leached Zeolite Catalyst, or Realuminated Zeolite with One or More Metal Atoms or Ions Comprising Mg, Ba, Sr, Cr, Fe, Co, Ni, Cu, Zn, Ga, Ce, Ag, Pd, Bi, Ti, V, Zr, Mo, or La, or a Mixture Thereof The step of modifying the provided zeolite catalyst, leached zeolite catalyst, or realuminated zeolite refers to that the step can be performed either: (1) at the step of providing the zeolite catalyst but before contacting the zeolite catalyst with the first composition, (2) after the production of the leached catalyst but before contacting the leached catalyst with the second composition, or (3) after the production of the realuminated zeolite.

In one aspect, the one or more metal atoms or ions comprise Mg. In another aspect, the one or more metal atoms or ions comprise Ba. In yet another aspect, the one or more metal atoms or ions comprise Sr. In yet another aspect, the one or more metal atoms or ions comprise Cr. In yet another aspect, the one or more metal atoms or ions comprise Fe. In yet another aspect, the one or more metal atoms or ions comprise Co. In yet another aspect, the one or more metal atoms or ions comprise Ni. In yet another aspect, the one or more metal atoms or ions comprise Cu. In yet another aspect, the one or more metal atoms or ions comprise An. In yet another aspect, the one or more metal atoms or ions comprise Ga. In yet another aspect, the one or more metal atoms or ions comprise Ce. In yet another aspect, the one or more metal atoms or ions comprise Ag. In yet another aspect, the one or more metal atoms or ions comprise Pd. In yet another aspect, the one or more metal atoms or ions comprise Bi. In yet another aspect, the one or more metal atoms or ions comprise Ti. In yet another aspect, the one or more metal atoms or ions comprise V. In yet another aspect, the one or more metal atoms or ions comprise Ar. In yet another aspect, the one or more metal atoms or ions comprise Mo. In yet another aspect, the one or more metal atoms or ions comprise W. In yet another aspect, the one or more metal atoms or ions comprise Li. In yet another aspect, the one or more metal atoms or ions comprise La. In yet another aspect, the one or more metal atoms or ions comprise a mixture of two or more of Mg, Ba, Sr, Cr, Fe, Co, Ni, Cu, Zn, Ga, Ce, Ag, Pd, Bi, Ti, V, Zr, Mo, W, Li, and La.

Titanium can be introduced using a solution of titanium chloride (TiCl$_4$) or titanium isopropoxide; iron can be introduced using Fe(III) nitrate, tungsten as ammonium tungstate and barium as barium nitrate. Solutions of the metal compounds can be aqueous or in another appropriate solvent that dissolves the metal atoms or ions. For example, isopropanol can be used to prepare solutions of titatium isopropoxide. As described elsewhere herein, the metals are introduced into the zeolite prior to or after the steps in the disclosed methods.

In one aspect, the metal loading of the resulting modified zeolite catalyst is 0.1% to 10% by weight. In another aspect, the metal loading of the resulting modified zeolite catalyst is 0.5% to 8% by weight. In yet another aspect, the metal loading of the resulting modified zeolite catalyst is 1% to 10% by weight. In yet another aspect, the metal loading of the resulting modified zeolite catalyst is 1% to 8% by weight. In yet another aspect, the metal loading of the resulting modified zeolite catalyst is 1% to 6% by weight. In yet another aspect, the metal loading of the resulting modified zeolite catalyst is 1% to 5% by weight. In yet another aspect, the metal loading of the resulting modified zeolite catalyst is 1% to 4% by weight. In yet another aspect, the metal loading of the resulting modified zeolite catalyst is 1% to 3% by weight. In yet another aspect, the metal loading of the resulting modified zeolite catalyst is 2% to 6% by weight. In yet another aspect, the metal loading of the resulting modified zeolite catalyst is 3% to 6% by weight. In yet another aspect, the metal loading of the resulting modified zeolite catalyst is 4% to 6% by weight.

Following treatment of the zeolite with metals as described about, it can be separated from the treating environment at each stage of treatment by filtration, centrifugation or other common means to remove the excess solution and other soluble components, optionally washing with water.

In one aspect, the method further comprises calcining the modified catalyst, i.e., heating at elevated temperatures, e.g. up to 650° C., for 5 hours. The calcination step can be carried out after all other steps in the method, however, calcination can also be carried out prior to the leaching step.

Figure 2:
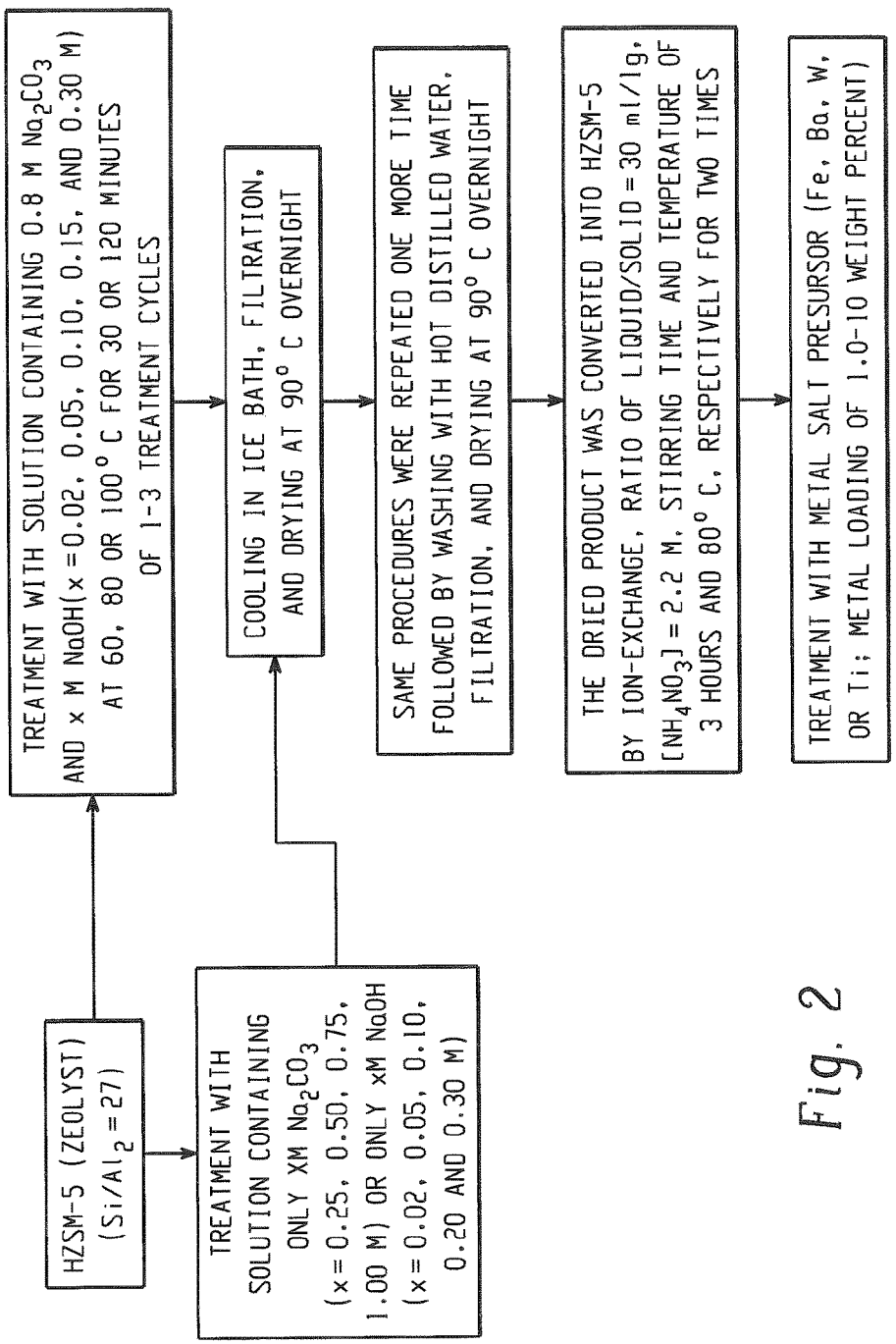
FIG. 2 shows a flow diagram of specific aspects of the disclosed methods for alkaline treatment (desilication) of HZSM-5 and preparation of metal containing desilicated HZSM-5 catalyst for selective catalytic cracking of naphtha to light olefins.

FIG. 2 shows specific aspects of the methods for modifying a zeolite catalyst. In one aspect, a HZSM-5 or ZSM-5 catalyst, such as a HZSM-5 or ZSM-5 catalyst with a Si/Al$_2$ ratio of 27, contacted with a first composition comprising Na$_2$CO$_3$, such as first composition comprising 0.8 M of Na$_2$CO$_3$, and NaOH, such as s first composition comprising from 0.02 M to 0.2 M NaOH, to produce a leached zeolite catalyst. The contacting of the first composition can be done at a temperature from 60° C. to 100° C. For example, the contacting of the first composition can be done a 60° C. for 2 hours, wherein the first composition comprises 0.8 M Na$_2$CO$_3$ and 0.02 M NaOH. After contacting with the first composition, the leached zeolite catalyst can be cooled, for example in an ice bath, filtered, and dried. The contacting step of the first catalyst can be performed one or more times. If one aspect, the contacting step of the first catalyst can be performed 1, 2, 3, 4, 5, or 6 times, such as, for example 1, 2, or 3 times. The leached zeolite catalyst, such as a ZSM-5 catalyst, can optionally be converted into H form via ion-exchange. The ion-exchange can be done using NH$_4$NO$_3$ as shown in FIG. 2. The leached zeolite catalyst can be modified with a solution comprising one or more metal atoms or ions comprising Ti, for example a solution comprising TiCl$_4$ or Ti-isopropoxide, to provide a modified catalyst, Fe, Ba, and/or W. The modified catalyst comprise from 1% by weight to 10 by weight Ti. The modified catalyst can then be calcined at 650° C. The heating rate for calcining the modified catalyst can be 3° C./min and the temperature can be held between 3-7 hours, such as 5 hours.

Figure 3:
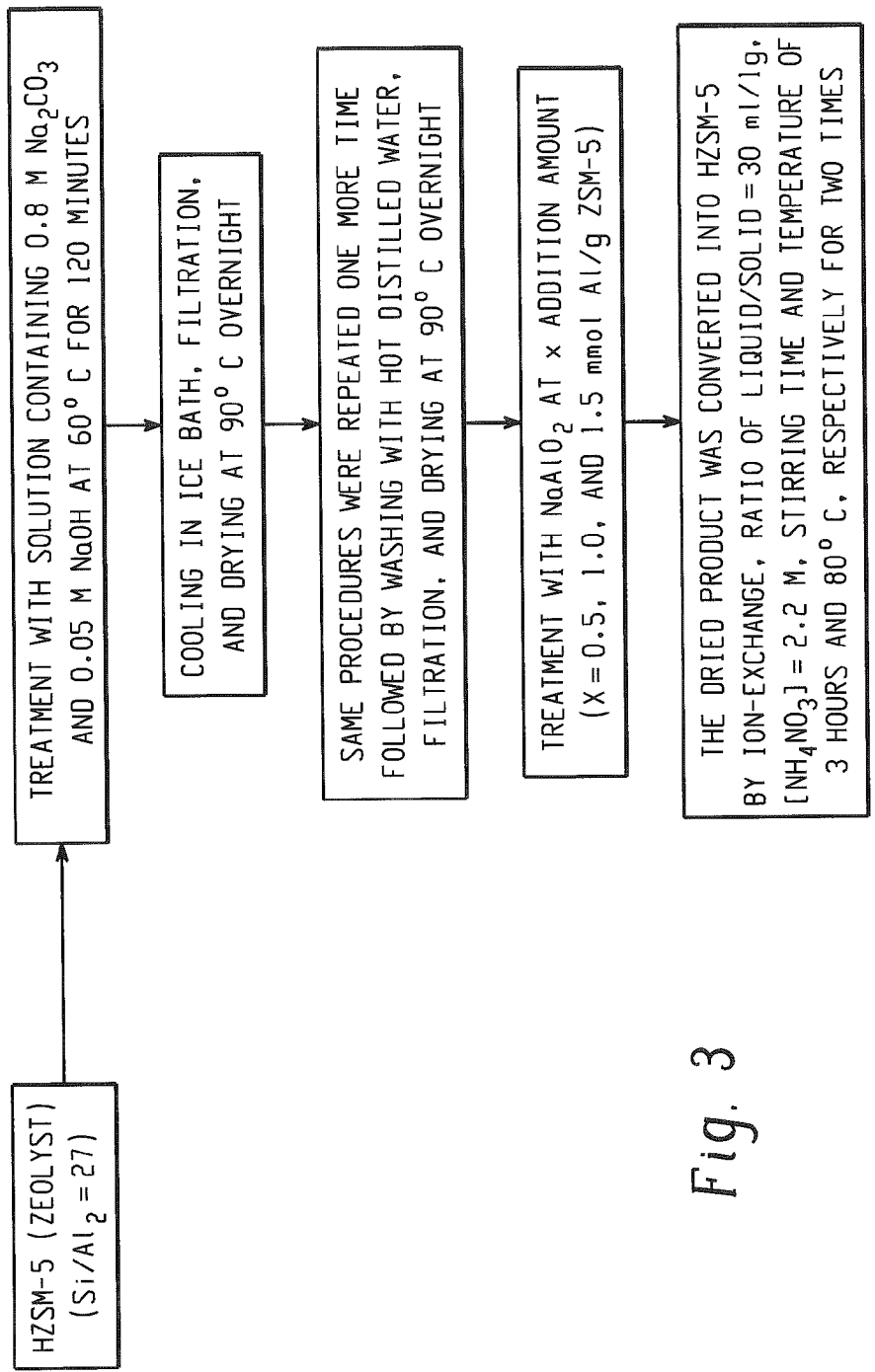
FIG. 3 shows a flow diagram of specific aspects of the disclosed methods for a procedure for $NaAlO_2$ treatment of alkaline treated (desilicated) HZSM-5 catalyst for selective catalytic cracking of naphtha to light olefins.

FIG. 3 shows specific aspects of the methods for modifying a zeolite catalyst. In one aspect, a HZSM-5 or ZSM-5 catalyst, such as a HZSM-5 or ZSM-5 catalyst with a Si/Al$_2$ ratio of 27, can be contacted with a first composition comprising Na$_2$CO$_3$, such as first composition comprising 0.8 M of Na$_2$CO$_3$, and NaOH, such as s first composition comprising from 0.05 M, to produce a leached zeolite catalyst. The contacting of the first composition can be done at a temperature from 60° C. to 100° C. For example, the contacting of the first composition can be done a 60° C. for 2 hours, wherein the first composition comprises 0.8 M Na$_2$CO$_3$ and 0.05 M NaOH. After contacting with the first composition, the leached zeolite catalyst can be cooled, for example in an ice bath, filtered, and dried. The contacting step of the first catalyst can be performed one or more times. If one aspect, the contacting step of the first catalyst can be performed 1, 2, 3, 4, 5, or 6 times, such as, for example 1, 2, or 3 times, such as for example 2 times. The leached zeolite catalyst can then be contacted with a second composition comprising a realuminating agent, such as NaAlO$_2$ at an amount from 0.5 to 1.5 millimole (mmol) of Al/g of ZSM-5 or HZSM-5. The second composition can be added at a rate from 0.1 to 1.0 ml/min at a concentration of 3 mmol/g ZSM-5 or HZSM-5, to produce a realuminated zeolite catalyst. The realuminated zeolite catalyst, such as a ZSM-5 catalyst, can optionally be converted into H form via ion-exchange. The ion-exchange can be done using NH$_4$NO$_3$ as shown in FIG. 3. The realuminated zeolite catalyst can then be modified with a solution comprising Ti, for example a solution comprising TiCl$_4$ or Ti-isopropoxide, to provide a modified catalyst. The modified catalyst comprise from 0.5% by weight to 10 by weight Ti. The modified catalyst can then be calcined at 650° C. The heating rate for calcining the modified catalyst can be 3° C./min and the temperature can be held between 3-7 hours, such as 5 hours.

Also disclosed herein is modified zeolite catalyst produced according to the methods described herein.

E. Performance of the Modified Catalyst

When the naphtha comprises 54.7% by weight alkane, 34.2% by weight iso-alkane, 9.6% by weight naphthenes, and 1.5% by weight aromatics, the modified zeolite catalyst can produce benzene, toluene, and xylene in combination in an amount of less than 2% by weight, for example, less than 1.5% by weight, or less than 1% by weight, or less than 0.5% by weight, or even less than or equal to 0.03% by weight.

When the naphtha comprises 54.7% by weight alkane, 34.2% by weight iso-alkane, 9.6% by weight naphthenes, and 1.5% by weight aromatics, the modified zeolite catalyst produces a product composition comprising a ratio of ethylene:propylene by weight of less than 1.5, for example, less than 1.2, or less than 0.90, or less than 0.50.

When the naphtha comprises 54.7% by weight alkane, 34.2% by weight iso-alkane, 9.6% by weight naphthenes, and 1.5% by weight aromatics, the modified zeolite catalyst produces a product composition comprising at least 20% propylene by weight, for example, at least 25% propylene by weight, or at least 30% propylene by weight. For example, when the naphtha comprises 54.7% by weight alkane, 34.2% by weight iso-alkane, 9.6% by weight naphthenes, and 1.5% by weight aromatics, the modified zeolite catalyst produces a product composition comprising from 22% to 30% propylene by weight, e.g., from 24% to 30% propylene by weight, or from 26% to 30% propylene by weight.

When the naphtha comprises 54.7% by weight alkane, 34.2% by weight iso-alkane, 9.6% by weight naphthenes, and 1.5% by weight aromatics, the modified zeolite catalyst produces a product composition comprising at least 42% propylene and ethylene by weight, for example, at least 48% propylene and ethylene by weight, or at least 52% propylene and ethylene by weight. For example, when the naphtha comprises 54.7% by weight alkane, 34.2% by weight iso-alkane, 9.6% by weight naphthenes, and 1.5% by weight aromatics, the modified zeolite catalyst produces a product composition comprising from 42% to 55% propylene and ethylene by weight, for example, from 44% to 52% propylene and ethylene by weight, or from 46% to 52% propylene by weight.

When the naphtha comprises 54.7% by weight alkane, 34.2% by weight iso-alkane, 9.6% by weight naphthenes, and 1.5% by weight aromatics, the modified zeolite catalyst maintains at least 75% of its original activity with respect to the production of a product composition comprising propylene over at least 2 straight run naphtha processes, for example, maintains at least 85% of its original activity with respect to the production of a product composition comprising propylene over at least 2 straight run naphtha processes, or maintains at least 90% of its original activity with respect to the production of a product composition comprising propylene over at least 2 straight run naphtha processes, or maintains at least 95% of its original activity with respect to the production of a product composition comprising propylene over at least 2 straight run naphtha processes.

When the naphtha comprises 54.7% by weight alkane, 34.2% by weight iso-alkane, 9.6% by weight naphthenes, and 1.5% by weight aromatics, the modified zeolite catalyst maintains at least 75% of its original activity with respect to the production of a product composition comprising propylene over at least 3 straight run naphtha processes, for example, maintains at least 85% of its original activity with respect to the production of a product composition comprising propylene over at least 3 straight run naphtha processes, or maintains at least 90% of its original activity with respect to the production of a product composition comprising propylene over at least 3 straight run naphtha processes, or even maintains at least 95% of its original activity with respect to the production of a product composition comprising propylene over at least 3 straight run naphtha processes.

Methods for the Catalytic Cracking of Naphtha with the Modified Zeolite Catalyst Compositions The modified zeolite catalyst produced by the methods described above is useful in the process for catalytic cracking (in the presence of steam) of straight run light naphtha (LSRN).

Accordingly, disclosed herein is a method of cracking naphtha comprising contacting naphtha with one or more modified zeolite catalysts as described elsewhere herein.

In one aspect, the method modified catalyst remains active after being contacted with the naphtha in the straight run naphtha process for at least 2 h. In another aspect, the method modified catalyst remains active after being contacted with the naphtha in the straight run naphtha process for at least 3 h. In yet another aspect, the method modified catalyst remains active after being contacted with the naphtha in the straight run naphtha process for at least 4 h. In yet another aspect, the method modified catalyst remains active after being contacted with the naphtha in the straight run naphtha process for at least 5 h. In yet another aspect, the method modified catalyst remains active after being contacted with the naphtha in the straight run naphtha process for at least 6 h. In yet another aspect, the method modified catalyst remains active after being contacted with the naphtha in the straight run naphtha process for at least 7 h.

In one aspect, the method is conducted at at least 600° C. In another aspect, the method is conducted at at least 650° C. In yet another aspect, the method is conducted at at least 700° C. In yet another aspect, the method is conducted from 500° C. to 700° C.

In one aspect, the method is conducted for at least 1 h. In another aspect, the method is conducted for at least 3 h. In yet another aspect, the method is conducted for at least 5 h. In yet another aspect, the method is conducted for at least 10 h. In yet another aspect, the method is conducted for at least 24 h. In yet another aspect, the method is conducted for at least 48 h.

The disclosed method can be conducted in a fixed-bed continuous flown reactor system such as a BTRS-JR™ reactor. The effectiveness of the catalyst can be determined by measuring the conversion %, the selectivity % and the amount of benzene, toluene and xylene (BTX) produced. Generally speaking, a catalyst that provides a higher conversion % of light olefins, such as propylene and lower conversion of benzene, toluene and xylene, is more useful. Products obtained are analyzed by HPLC or GC, and for each run, total conversion (%), selectivity (%) and yields (%) of various product classes are determined. Selectivity is calculated by dividing the product yield % by the total conversion %.

The object of the cracking process is to convert the LRSN to lower hydrocarbons, namely alkanes and alkene, such as, for example, propylene. The disclosed method minimizes the production of side products benzene, toluene and xylenes which can deactivate the catalytic effectiveness of the modified zeolite catalysts. The effectiveness of the modified zeolite catalyst is measured by analysis of the products produced. In addition, the stability of the catalyst is measured by repeating the cracking process, using catalyzed that had be used in up to three reaction cycles.

Overall effectiveness and yield profiles of products produced by the modified zeolite catalyst can also be compared to steam cracking conditions in which unmodified zeolite or glass beads are used.

More specific examples of the methods for cracking naphthas are shown below. These examples are illustrative of several aspects of the invention but are not to be construed as limiting to the scope of the invention in any way.

Aspects of the Disclosed Compositions and Methods

Aspects of the present invention disclose one or more modifications of HZSM-5 to produce a modified catalyst, and the use of the modified zeolite catalyst in the production of lower hydrocarbon molecules, e.g., propylene, from higher molecular weight materials such as light straight run naphtha. These modifications include leaching of the zeolite with bases (leaching) and/or treating the catalyst with $AlO_2$ (realumination) in order to reduce the ratio of Si to Al. In addition, modifications include a realumination introducing various metals, such as titanium, barium, tungsten and iron into the catalyst structure.

The invention includes at least the following aspects:

Aspect 1: A method of modifying a zeolite catalyst and comprising:

providing a zeolite catalyst;

contacting the zeolite catalyst with a first composition comprising NaOH and $Na_2CO_3$, thereby producing a leached zeolite catalyst;

contacting the leached zeolite with a second composition comprising a realuminating agent, thereby producing a realuminated zeolite catalyst;

modifying the provided zeolite catalyst, leached zeolite catalyst, or realuminated zeolite with a metal atom or ion comprising Mg, Ba, Sr, Cr, Fe, Co, Ni, Cu, Zn, Ga, Ce, Ag, Pd, Bi, Ti, V, Zr, Mo, W, Li, La, or a combination thereof, wherein the method produces a modified zeolite catalyst.

Aspect 2: The method of aspect 1 wherein the method produces a modified zeolite catalyst, wherein the realuminating agent comprises NaAlO$_2$, KAlO$_2$, or a mixture thereof.

Aspect 3: The method of aspects 1 or 2, wherein the provided zeolite catalyst comprises HZSM-5.

Aspect 4: The method of any one of aspects 1-3, wherein the provided zeolite catalyst has a Si/Al$_2$ ratio of 27.

Aspect 5: The method of any one of aspects 1-4, wherein the first composition comprises 0.02 M NaOH and 0.8 M Na$_2$CO$_3$.

Aspect 6: The method of any one of aspects 1-5, wherein the second composition comprises from 0.5 mmol to 4.0 mmol of Al per gram of leached zeolite catalyst.

Aspect 7: The method of any one of aspects 1-6, wherein the one or more metal atoms or ions comprises Ti.

Aspect 8: The method of any one of aspects 1-7, wherein modifying the provided zeolite catalyst, leached zeolite catalyst, or realuminated zeolite with a metal atom or ion comprises contacting the provided zeolite catalyst, leached zeolite catalyst, or realuminated zeolite with third composition comprising TiCl$_4$ or Ti-isopropoxide.

Aspect 9: The method of any one of aspects 1-8, wherein the metal loading the modified zeolite catalyst is from 0.5% to 10.0% by weight.

Aspect 10: The method of any one of aspects 1, 2, or 4-9, wherein the method further comprises converting the modified zeolite catalyst into H-form.

Aspect 11: A modified zeolite catalyst produced according to the method of any one of aspects 1-10.

Aspect 12: The modified zeolite catalyst of aspect 11, wherein the modified zeolite catalyst produces benzene, toluene, and xylene in combination in an amount of less than 0.5% by weight when the modified zeolite catalyst is contacted with naphtha in a straight run naphtha process, wherein the naphtha comprises 54.7% by weight alkane, 34.2% by weight iso-alkane, 9.6% by weight naphthenes, and 1.5% by weight aromatics.

Aspect 13: The modified zeolite catalyst of aspects 11 or 12, wherein modified zeolite catalyst remains active after being contacted with the naphtha in the straight run naphtha process for 6 h.

Aspect 14: A method of cracking naphtha comprising contacting naphtha with the modified zeolite catalyst of any one of aspects 11-13.

Aspect 15: The method of aspect 14, wherein the method produces ethylene and propylene in combination in a yield of greater than 45%.

Aspect 16: The method of aspect 14, wherein the selectivity of the method for the production of ethylene and propylene in combination is in a yield of greater than 58%.

Aspect 17: The method of aspect 14, wherein the selectivity of the method for the production of ethylene and propylene in combination is in a yield of greater than 60%.

Aspect 18: The method of anyone of aspects 14-17, wherein the method produces ethylene and propylene in a ratio less than 0.9.

Aspect 19: The method of anyone of aspects 14-17, wherein the method produces ethylene and propylene in a ratio less than 0.8.

Aspect 20: The method of anyone of aspects 14-19, wherein the method produces benzene, toluene, and xylene in combination in an amount of less than 0.8% by weight when the modified zeolite catalyst is contacted with naphtha in a straight run naphtha process, wherein the naphtha comprises 54.7% by weight alkane, 34.2% by weight iso-alkane, 9.6% by weight naphthenes, and 1.5% by weight aromatics.

Aspect 21: The method of anyone of aspects 14-20, wherein the contacting occurs in the presence of steam.

Aspect 22: A method of cracking naphtha comprising contacting naphtha with a modified zeolite catalyst produced according to the method of any one of aspects 1-10.

It is contemplated that each disclosed derivative can be optionally further substituted. It is also contemplated that any one or more derivative can be optionally omitted from the invention. It is understood that a disclosed compound can be provided by the disclosed methods. It is also understood that the disclosed compounds can be employed in the disclosed methods of using.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Several methods for preparing and using the modified zeolite catalyst of this invention are illustrated in the following Examples. Starting materials and the requisite intermediates are, in some cases, commercially available, or can be prepared according to literature procedures or as illustrated herein.

Table 1 shows the physical properties of the straight run light naphtha that was used in the Examples described herein.

TABLE 1

| The physical properties of the straight run light naphtha (LSRN) feedstocks | |
|---|---|
| Property | Data |
| Density (20° C.) kg/m$^3$ | 657 |
| Boiling Range | |
| Initial Boiling Point, ° C. | 48.3 |
| End Boiling Point, ° C. | 88.4 |
| Saturated vapor pressure (20° C.) KPa | 70.4 |
| Chemical Composition (wt %) | |
| Alkane | 54.7 |
| Iso-alkane | 34.2 |
| Naphthenes | 9.60 |
| Aromatics | 1.50 | kg/m$^3$ = kilograms per cubic meter
KPa = kiloPascals

The naphtha-steam cracking experiments were conducted in a continuous flow fixed-bed reactor system (BTRS-JR™ reactor by Autoclave Engineers). The hastelloy reactor tube was 20 cm long with an inner diameter of 20 mm. 1 gram of the test catalyst was loaded in the reactor for each reaction test. A nitrogen flow of 5.00 mL/min$^{-1}$ was used as the carrier gas stream. Straight run light naphtha (LSRN, see properties in Table 1) and water were injected into the reactor by using two separate HPLC pumps (Gilson). The testing conditions were set as follows: weight hourly space velocity (WHSV) (i.e., grams of LSRN injected per hour per gram of catalyst) was 1.5 to 6.5 $h^{-1}$ (e.g., 5.0 $h^{-1}$); steam/naphtha molar ratio was 0.5; reaction temperature was 650° C.; and duration of the run was 6 h. Gaseous and liquid products were collected separately using a system of condensers. The gas-phase components were analyzed using a Shimadzu GC equipped with a GS-alumina micropacked column, and FID and TCD detectors, while the liquid phase analysis was carried out using a Shimadzu PIONA GC equipped with FID detector.

Example 1: Leaching with Varying Concentrations of NaOH and a Fixed Concentration of $Na_2CO_3$ Variation 1

1 g of HZSM-5 (from Zeolyst) with $Si/Al_2$=27 was stirred in 60 mL solution containing 0.8 M $Na_2CO_3$ and xM NaOH (x=0.02-0.30 M). The mixture was stirred for 2 h at 60° C., cooled to room temperature by ice bath, filtered and finally dried at room temperature for 3 h. The dried powder was resuspended in fresh solution and treatment was repeated one more time. The product was washed with 80 mL of hot distilled water (70° C.), and dried at room temperature overnight. The final product was subjected to ion-exchange procedures by mixing 1 g of dried powder in 30 mL of solution containing 2.2 M of $NH_4NO_3$ for 3 h at 80° C.

The results of Example 1 are shown in Table 2.

TABLE 2

Catalytic cracking of LSRN over desilicated HZSM-5 ($Si/Al_2$ = 27) as a function of varying concentration of NaOH

| | Desilication of HZSM-5 ($Si/Al_2$ = 27) by 0.8M $Na_2CO_3$+ x M NaOH, at 60° C./120 min. | | | | | |
|---|---|---|---|---|---|---|
| | x = 0.0 | 0.02 | 0.05 | 0.10 | 0.15 | 0.30 |
| Mass balance | 93.3 | 97.0 | 98.6 | 100.8 | 92.4 | 102.9 |
| Conversion, % | 78.9 | 86.1 | 86.8 | 81.3 | 84.6 | 66.4 |
| Yields, wt. % | | | | | | |
| $C_3^- + C_2^-$ | 41.5 | 50.6 | 49.7 | 47.0 | 42.9 | 38.1 |
| $C_3^-$ | 22.7 | 26.0 | 25.8 | 25.8 | 21.6 | 24.1 |
| $C_2^-$ | 18.9 | 24.7 | 23.9 | 21.2 | 21.4 | 14.1 |
| $C_2^-/C_3^-$ | 0.80 | 1.00 | 0.90 | 0.80 | 1.00 | 0.60 |
| $C_4^-$ | 6.60 | 6.80 | 7.00 | 7.10 | 5.40 | 8.00 |
| BTX | 7.10 | 0.80 | 1.70 | 1.90 | 4.20 | 2.10 |
| $C_1$-$C_4$ alkane | 23.7 | 27.9 | 28.5 | 25.3 | 32.1 | 18.1 |
| $C_1$ | 6.60 | 8.20 | 8.10 | 7.30 | 11.1 | 5.50 |
| $C_2$ | 7.80 | 10.3 | 10.3 | 9.50 | 11.7 | 6.50 |
| $C_3$ | 6.30 | 8.00 | 8.60 | 7.20 | 7.90 | 4.90 |
| $C_4$ | 3.10 | 1.30 | 1.40 | 1.30 | 1.30 | 1.20 |
| $C_5^+$ | 18.4 | 12.6 | 11.9 | 17.2 | 13.0 | 32.0 |
| $C_5$ | 6.40 | 3.80 | 4.10 | 7.00 | 3.90 | 14.9 |
| $C_6$ | 11.0 | 8.70 | 7.40 | 9.80 | 8.30 | 16.7 |
| $C_7$ | 0.90 | 0.20 | 0.40 | 0.40 | 0.80 | 0.40 |
| $H_2$ | 0.80 | 1.00 | 1.00 | 0.90 | 1.50 | 0.70 |
| Selectivity, % | | | | | | |
| $C_3^- + C_2^-$ | 52.6 | 58.8 | 57.2 | 57.8 | 50.8 | 57.4 |
| $C_3^-$ | 28.7 | 30.2 | 29.8 | 31.7 | 25.5 | 36.3 |
| $C_2^-$ | 23.9 | 28.6 | 27.5 | 26.1 | 25.3 | 21.2 |
| BTX | 9.00 | 0.90 | 1.90 | 2.40 | 5.00 | 3.20 |

T = 650° C., W.H.S.V. = 4.7-5.2 $h^{-1}$, steam/naphtha ratio = 0.5-0.7, and atmospheric pressure

Example 2: Leaching with Varying Concentrations of NaOH in the Absence of $Na_2CO_3$ 1 g of HZSM-5 (from Zeolyst) with $Si/Al_2$=27 was stirred in 60 mL solution containing x M NaOH (x=0.02-0.30 M). The mixture was stirred for 2 h at 60° C.). Then, the solution was cooled to room temperature by ice bath, filtered and finally dried at room temperature for 3 h. The dried powder was resuspended in fresh solution and treatment was repeated one more time. The product was washed with 80 mL of hot distilled water (70° C.), and dried at room temperature overnight. The final product was subjected to ion-exchange procedures by mixing 1 g of dried powder in 20 mL of solution containing 2.2 M of $NH_4NO_3$ for 3 h at 80° C. The ion exchange procedure was then repeated.

Table 3 shows the results from Example 2.

TABLE 3

Catalytic performance of desilicated HZSM-5 as a function of desilication prepared as in Examples 2 and 3

| | Desilication of HZSM-5 ($Si/Al_2$ = 27) by x M NaOH or $Na_2CO_3$, at 60° C./120 min. | | | | | |
|---|---|---|---|---|---|---|
| | NaOH, x M | | $Na_2CO_3$, x M | | | |
| | x = 0.02 | 0.05 | x = 0.25 | 0.50 | 0.75 | 1.0 |
| Mass balance | 93.4 | 100.3 | 89.0 | 100.7 | 99.7 | 93.3 |
| Conversion, % | 79.3 | 80.6 | 76.1 | 81.4 | 86.0 | 57.7 |
| Yields, wt. % | | | | | | |
| $C_3^- + C_2^-$ | 45.2 | 47.4 | 44.4 | 47.4 | 49.0 | 51.2 |
| $C_3^-$ | 24.9 | 26.8 | 25.7 | 25.6 | 25.6 | 29.0 |
| $C_2^-$ | 20.3 | 20.6 | 18.8 | 21.8 | 23.4 | 22.3 |
| $C_2^-/C_3^-$ | 0.80 | 0.80 | 0.70 | 0.90 | 1.00 | 0.80 |
| $C_4^-$ | 7.60 | 8.00 | 7.70 | 7.30 | 6.30 | 8.60 |
| BTX | 0.80 | 0.70 | 1.40 | 1.40 | 1.40 | 1.50 |
| $C_1$-$C_4$ alkane | 25.6 | 24.5 | 22.6 | 25.2 | 29.3 | 26.3 |
| $C_1$ | 7.50 | 6.80 | 6.20 | 7.10 | 9.10 | 7.30 |
| $C_2$ | 9.20 | 8.9 | 8.30 | 9.20 | 10.5 | 9.70 |
| $C_3$ | 7.40 | 7.40 | 6.70 | 7.60 | 8.30 | 7.90 |
| $C_4$ | 1.50 | 1.40 | 1.30 | 1.40 | 1.40 | 1.50 |
| $C_5^+$ | 19.3 | 17.5 | 22.9 | 17.5 | 12.1 | 11.2 |
| $C_5$ | 8.80 | 7.80 | 10.1 | 7.10 | 3.80 | 8.40 |
| $C_6$ | 10.3 | 9.80 | 12.8 | 10.4 | 8.10 | 2.70 |
| $C_7$ | 0.10 | 0.00 | 0.00 | 0.00 | 0.00 | 0.00 |
| $H_2$ | 0.80 | 0.80 | 0.90 | 0.90 | 1.10 | 0.88 |
| Selectivity, % | | | | | | |
| $C_3^- + C_2^-$ | 57.1 | 58.8 | 58.4 | 58.3 | 57.1 | 58.4 |
| $C_3^-$ | 31.4 | 33.2 | 33.8 | 31.5 | 29.8 | 33.0 |
| $C_2^-$ | 25.6 | 25.6 | 24.6 | 26.8 | 27.3 | 25.4 |
| BTX | 1.00 | 0.90 | 1.80 | 1.70 | 1.63 | 1.70 |

T = 650° C., W.H.S.V. = 4.7-5.2 $h^{-1}$, steam/naphtha ratio = 0.5-0.7, and atmospheric pressure

Example 3: Leaching with Varying Concentrations of $Na_2CO_3$ in the Absence of NaOH 1 g of HZSM-5 (from Zeolyst) with $Si/Al_2$=27 was stirred in 60 mL solution containing x M $Na_2CO_3$ (x=0.25-1.0 M). The mixture was stirred for 2 h at 60° C.). Then, the solution was cooled to room temperature by ice bath, filtered and finally dried at room temperature for 3 h. The dried powder was resuspended in fresh solution and treatment was repeated one more time. The product was washed with 80 mL of hot distilled water (70° C.), and dried at room temperature overnight. The final product was subjected to ion-exchange procedures by mixing 1 g of dried powder in 20 mL of solution containing 2.2 M of $NH_4NO_3$ for 3 h at 80° C. The ion exchange procedure was then repeated.

Table 3 (above) shows the results from Example 3.

Example 4: Leaching with a Fixed Concentrations of NaOH and $Na_2Co_3$ Solutions, at Various Desilication Temperatures 1 g of HZSM-5 (from Zeolyst) with $Si/Al_2$=27 was stirred in 60 mL solution containing 0.8 M $Na_2CO_3$ and 0.05 M NaOH. The mixture was stirred for 2 h at various temperature (T) (T=60, 80 and 100° C.). Then, the solution was cooled to room temperature by ice bath, filtered and finally dried at room temperature for 3 h. The dried powder was resuspended in fresh solution and treatment was repeated one more time. The product was washed with 80 mL of hot distilled water (70° C.), and dried at room temperature overnight. The final product was subjected to ion-exchange procedures by mixing 1 g of dried powder in 30 mL of solution containing 2.2 M of $NH_4NO_3$ for 3 h at 80° C.

Example 5: Leaching with a Fixed Concentrations of NaOH and $Na_2Co_3$, at Various Desilication Times 1 g of HZSM-5 (from Zeolyst) with $Si/Al_2$=27 was stirred in 60 mL solution containing 0.8 M $Na_2CO_3$ and 0.05 M NaOH. The mixture was subjected to desilication process using variable time (½ h, 2 h) and temperature (60, 80, 100° C.). Then, the solution was cooled to room temperature by ice bath, filtered and finally dried at room temperature for 3 h. The dried powder was resuspended in fresh solution and treatment was repeated one more time. The product was washed with 80 mL of hot distilled water (70° C.), and dried at room temperature overnight. The final product was subjected to ion-exchange procedures by mixing 1 g of dried powder in 20 mL of solution containing 2.2 M of $(NH_4)_2SO_4$ for 3 h at 80° C. The ion exchange procedure was then repeated.

Table 4 shows the results from Examples 4 and 5.

TABLE 4

Catalytic performance of desilicated HZSM-5 as a function of desilication (i.e. desilication temperature and time) as prepared in Example 4 and 5

| | Desilication of HZSM-5 ($Si/Al_2$ = 27) by 0.8M $Na_2CO_3$ + 0.05M NaOH, at different conditions | | | | |
|---|---|---|---|---|---|
| | 60° C./30 min. | 80° C./30 min. | 80° C./120 min. | 100° C./30 min. | 100° C./120 min. |
| Mass balance | 95.5 | 100.2 | 97.1 | 98.9 | 93.8 |
| Conversion, % | 75.0 | 78.8 | 78.7 | 84.9 | 78.3 |
| Yields, wt. % | | | | | |
| $C_3^= + C_2^=$ | 44.1 | 46.5 | 46.6 | 49.5 | 46.5 |
| $C_3^=$ | 24.9 | 26.5 | 26.4 | 26.0 | 25.9 |
| $C_2^=$ | 19.1 | 20.1 | 20.2 | 23.5 | 20.6 |
| $C_2^=/C_3^=$ | 0.80 | 0.80 | 0.80 | 0.90 | 0.80 |
| $C_4^=$ | 7.60 | 7.90 | 7.80 | 7.10 | 7.70 |
| BTX | 1.30 | 1.40 | 1.40 | 1.50 | 1.40 |
| $C_1$-$C_4$ alkane | 22.0 | 23.0 | 22.9 | 26.9 | 22.7 |
| $C_1$ | 6.00 | 6.30 | 6.20 | 7.50 | 6.10 |
| $C_2$ | 8.10 | 8.30 | 8.40 | 9.80 | 8.30 |
| $C_3$ | 6.60 | 7.10 | 7.00 | 8.20 | 7.00 |
| $C_4$ | 1.20 | 1.30 | 1.30 | 1.40 | 1.30 |
| $C_5^+$ | 24.1 | 20.1 | 20.3 | 13.9 | 20.8 |
| $C_5$ | 10.6 | 8.20 | 8.40 | 5.20 | 9.00 |
| $C_6$ | 13.5 | 12.0 | 11.8 | 8.76 | 11.7 |
| $C_7$ | 0.00 | 0.00 | 0.00 | 0.00 | 0.00 |
| $H_2$ | 0.80 | 0.80 | 0.80 | 0.93 | 0.76 |
| Selectivity, % | | | | | |
| $C_3^= + C_2^=$ | 58.8 | 59.0 | 59.3 | 58.3 | 59.4 |
| $C_3^=$ | 33.3 | 33.6 | 33.6 | 30.6 | 33.1 |
| $C_2^=$ | 25.5 | 25.4 | 25.7 | 27.6 | 26.3 |
| BTX | 1.80 | 1.70 | 1.80 | 1.71 | 1.80 |

T = 650° C.,
W.H.S.V. = 4.7-5.2 $h^{-1}$,
steam/naphtha ratio = 0.5-0.7, and atmospheric pressure

Example 6: Leaching with a Fixed Concentrations of NaOH and $Na_2Co_3$ Solutions, at Various Desilication Cycles 1 g of HZSM-5 (from Zeolyst) with $Si/Al_2$=27 was stirred in 60 mL solution containing 0.8 M $Na_2CO_3$ and 0.05 M NaOH. The mixture was stirred for 2 h at 60° C., cooled to room temperature by ice bath, filtered and finally dried at room temperature for 3 h ($1^{st}$ cycle). The dried powder was resuspended in fresh solution and treatment was repeated one more time ($2^{nd}$ cycle). The mixture was cooled to room temperature by ice bath, filtered and then dried at room temperature for 3 h. Then, he dried powder was resuspended in fresh solution and treatment was repeated one more time ($3^{rd}$ cycle). The product was then washed with 80 mL of hot distilled water (70° C.), and dried at room temperature overnight. The final product was subjected to ion-exchange procedures by mixing 1 g of dried powder in 30 mL of solution containing 2.2 M of $NH_4NO_3$ for 3 h at 80°.

Table 5 shows the results of Example 6.

TABLE 5

Catalytic cracking of LSRN over desilicated HZSM-5 ($Si/Al_2$ = 27) as prepared in Example 6

| | Desilication of HZSM-5 ($Si/Al_2$ = 27) by 0.8M $Na_2CO_3$ + 0.05M NaOH, 60° C./2 h. | | |
|---|---|---|---|
| | 1 cycle | 2 cycles | 3 cycles |
| Mass balance | 103 | 97.0 | 97.5 |
| Conversion, % | 82.7 | 86.1 | 75.1 |
| Yields, wt. % | | | |
| $C_3^= + C_2^=$ | 49.4 | 50.6 | 45.2 |
| $C_3^=$ | 27.5 | 26.0 | 27.7 |
| $C_2^=$ | 21.9 | 24.7 | 17.5 |
| $C_2^=/C_3^=$ | 0.80 | 1.00 | 0.60 |
| $C_4^=$ | 8.10 | 6.80 | 8.70 |
| BTX | 0.10 | 0.80 | 0.30 |
| $C_1$-$C_4$ alkane | 25.1 | 27.9 | 20.9 |
| $C_1$ | 6.50 | 8.20 | 5.30 |
| $C_2$ | 9.00 | 10.3 | 7.70 |
| $C_3$ | 7.90 | 8.00 | 6.60 |
| $C_4$ | 1.60 | 1.30 | 1.40 |
| $C_5^+$ | 16.1 | 12.6 | 23.8 |
| $C_5$ | 7.10 | 3.80 | 11.6 |
| $C_6$ | 9.00 | 8.70 | 12.1 |
| $C_7$ | 0.00 | 0.00 | 0.00 |
| $H_2$ | 0.80 | 1.00 | 0.70 |
| Selectivity, % | | | |
| $C_3^= + C_2^=$ | 59.8 | 58.8 | 60.3 |
| $C_3^=$ | 33.4 | 30.2 | 37.1 |
| $C_2^=$ | 26.4 | 28.6 | 23.1 |
| BTX | 0.20 | 0.90 | 0.40 |

T = 650° C.,
W.H.S.V. = 4.7-5.2 $h^{-1}$,
steam/naphtha ratio = 0.5-0.7, and atmospheric pressure

Example 7: Realumination of Desilicated Catalyst with $NaAlO_2$ 1 g of HZSM-5 (from Zeolyst) with $Si/Al_2$=27 was stirred in 60 mL solution containing 0.8 M $Na_2CO_3$ and 0.05 M NaOH for 2 h at 60° C. Then, the solution was cooled to room temperature by ice bath, filtered and finally dried at room temperature for 3 h. The dried powder was resuspended in fresh solution and treatment was repeated one more time. The product was washed with 80 mL of hot distilled water (70° C.), and dried at room temperature overnight. The dried product was then treated with $NaAlO_2$ at the addition of x mmol of Al per g zeolite (x=0.5, 1.0, or 1.5) at rate of 0.70 mL/min. The final product was subjected to ion-exchange procedures by mixing 1 g of dried powder in 30 mL of aqueous solution containing 2.2 M of $NH_4NO_3$ for 3 h at 80° C. The ion exchange procedure was then repeated.

Table 6 shows the results of Example 7.

TABLE 6

Catalytic cracking of LSRN over $NaAlO_2$ treated desilicated HZSM-5 ($Si/Al_2$ = 27) as prepared in Example 7

| | $NaAlO_2$ treatment of desilicated HZSM-5 (($Si/Al_2$ = 27, 0.10M NaOH + 0.8M $Na_2CO_3$, at 60° C./2 h) (x is mmol Al/g ZSM-5) | | | |
|---|---|---|---|---|
| | x = 0 | 0.5 | 1.00 | 1.50 |
| Mass balance | 98.6 | 100 | 99.5 | 98.4 |
| Conversion, % | 86.8 | 85.5 | 87.6 | 85.0 |
| Yields, wt. % | | | | |
| $C_3^=$ + $C_2^=$ | 49.7 | 48.4 | 50.8 | 47.1 |
| $C_3^=$ | 25.8 | 24.9 | 26.3 | 24.3 |
| $C_2^=$ | 23.9 | 23.5 | 24.5 | 22.8 |
| $C_2^=/C_3^=$ | 0.90 | 0.94 | 0.93 | 0.94 |
| $C_4^=$ | 7.00 | 7.10 | 7.10 | 7.00 |
| BTX | 1.70 | 1.45 | 1.00 | 1.95 |
| $C_1$-$C_4$ alkane | 28.5 | 28.5 | 28.7 | 28.9 |
| $C_1$ | 8.10 | 8.00 | 7.50 | 8.55 |
| $C_2$ | 10.3 | 11.0 | 10.3 | 9.90 |
| $C_3$ | 8.60 | 8.25 | 8.85 | 8.75 |
| $C_4$ | 1.40 | 1.25 | 2.00 | 1.65 |
| $C_5^+$ | 11.9 | 13.6 | 11.8 | 14.1 |
| $C_5$ | 4.10 | 4.25 | 3.90 | 4.75 |
| $C_6$ | 7.40 | 8.85 | 7.50 | 8.95 |
| $C_7$ | 0.40 | 0.50 | 0.40 | 0.40 |
| $H_2$ | 1.00 | 1.00 | 0.99 | 1.00 |
| Selectivity, % | | | | |
| $C_3^=$ + $C_2^=$ | 57.2 | 56.9 | 58.0 | 55.4 |
| $C_3^=$ | 29.8 | 29.3 | 30.0 | 28.6 |
| $C_2^=$ | 27.5 | 27.6 | 28.0 | 26.8 |
| BTX | 1.90 | 1.70 | 1.14 | 2.30 |

T = 650° C.,
W.H.S.V. = 4.7-5.2 $h^{-1}$,
steam/naphtha ratio = 0.5-0.7, and atmospheric pressure Example 8: Leaching Followed by Metallization with Varying Amounts of Ti 1 gram (g) of HZSM-5 (from Zeolyst) with $Si/Al_2$=27 was stirred in 60 milliliter (mL) solution containing 0.8 M $Na_2CO_3$ and 0.05 M NaOH for 2 h at 60° C., cooled to room temperature by ice bath, filtered and finally dried at room temperature for 3 hours (h). The dried powder was resuspended in fresh solution and treatment was repeated one more time. The product was washed with 80 mL of hot distilled water (70° C.), and dried at room temperature overnight. The final product was subjected to ion-exchange procedures by mixing 1 g of dried powder in 30 mL of solution containing 2.2 M of $NH_4NO_3$ for 3 h at 80° C. The same procedures were repeated one more time. The final modified HZSM-5 was stirred in solution containing the amount of Ti precursor (either $TiCl_4$ (example 8a) or Ti-isopropoxide (example 8b)) that corresponded to loading range of 0.5-10.0 weight percent (wt %). The mixture was stirred for 3 h and solvent was removed at 60° C. in a drying oven, dried at 90° C. overnight and calcined at 650° C. for 5 h with heating rate of 3° C./min.

Table 7 shows the results of Example 8.

TABLE 7

Catalytic cracking of LSRN over desilicated HZSM-5 ($Si/Al_2$ = 27) as prepared in Example 8a and 8b

| Metal loading (wt %) | Metal Aqueous Impregnation onto Desilicated HZSM-5 ($Si/Al_2$ = 27, 0.8M $Na_2CO_3$+, 0.05M NaOH, 60° C./2 h) | | | | | | | |
|---|---|---|---|---|---|---|---|---|
| | $Ti^a$ | | | | $Ti^b$ | | | |
| | 1.0 | 2.0 | 4.0 | 10.0 | 1.0 | 2.0 | 4.0 | 10.0 |
| Mass balance | 99.7 | 101 | 97.6 | 98.1 | 96.5 | 99.5 | 91.4 | 101 |
| Conversion, % | 80.4 | 78.3 | 81.1 | 81.5 | 82.8 | 81.7 | 82.7 | 78.8 |
| Yields, wt. % | | | | | | | | |
| $C_3^=$ + $C_2^=$ | 48.8 | 48.9 | 49.7 | 48.0 | 47.0 | 44.0 | 47.4 | 48.0 |
| $C_3^=$ | 27.9 | 28.9 | 28.1 | 25.4 | 24.9 | 22.4 | 28.5 | 25.4 |
| $C_2^=$ | 20.9 | 20.0 | 21.6 | 22.6 | 22.1 | 21.6 | 18.9 | 22.6 |
| $C_2^=/C_3^=$ | 0.80 | 0.70 | 0.80 | 0.90 | 0.90 | 1.10 | 0.70 | 0.90 |
| $C_4^=$ | 6.80 | 7.00 | 6.80 | 7.00 | 6.80 | 5.40 | 8.40 | 7.00 |
| BTX | 0.20 | 0.20 | 0.20 | 0.20 | 0.20 | 0.20 | 0.30 | 0.20 |
| $C_1$-$C_4$ alkane | 24.7 | 22.3 | 24.4 | 27.7 | 27.9 | 33.1 | 22.7 | 27.7 |
| $C_1$ | 6.90 | 5.80 | 6.60 | 8.50 | 7.90 | 11.6 | 6.50 | 8.50 |
| $C_2$ | 8.90 | 8.20 | 8.80 | 9.70 | 10.2 | 12.5 | 8.10 | 9.70 |
| $C_3$ | 7.40 | 6.90 | 7.50 | 8.00 | 8.40 | 8.00 | 6.70 | 8.00 |
| $C_4$ | 1.50 | 1.40 | 1.50 | 1.40 | 1.50 | 1.00 | 1.40 | 1.40 |
| $C_5^+$ | 18.4 | 20.6 | 17.7 | 15.6 | 17.0 | 15.3 | 20.1 | 15.6 |
| $C_5$ | 8.30 | 9.00 | 7.50 | 5.60 | 5.40 | 3.60 | 8.70 | 5.60 |
| $C_6$ | 10.1 | 11.5 | 10.2 | 10.0 | 11.6 | 11.6 | 11.4 | 10.0 |
| $C_7$ | 0.00 | 0.00 | 0.00 | 0.00 | 0.00 | 0.00 | 0.00 | 0.00 |
| $H_2$ | 0.90 | 0.80 | 0.80 | 1.20 | 1.10 | 1.70 | 0.88 | 1.20 |
| Selectivity, % | | | | | | | | |
| $C_3^=$ + $C_2^=$ | 60.8 | 62.5 | 61.3 | 58.0 | 57.5 | 53.3 | 60.3 | 58.0 |
| $C_3^=$ | 35.1 | 37.0 | 34.8 | 30.8 | 30.6 | 27.1 | 36.4 | 30.8 |
| $C_2^=$ | 25.8 | 25.4 | 26.6 | 27.2 | 26.9 | 26.1 | 23.8 | 27.2 |
| BTX | 0.20 | 0.20 | 0.20 | 0.20 | 0.20 | 0.20 | 0.30 | 0.20 |

T = 650° C., W.H.S.V. = 4.7-5.2 $h^{-1}$, steam/naphtha ratio = 0.5-0.7, and atmospheric pressure;
[a]Tiisopropoxide;
[b]$TiCl_4$ Example 9: Leaching Followed by Metallization with Varying Amounts of Fe, Ba or W 1 g of HZSM-5 (from Zeolyst) with $Si/Al_2$=27 was stirred in 60 mL solution containing 0.8 M $Na_2CO_3$ and 0.05 M NaOH for 2 h at 60° C., cooled to room temperature by ice bath, filtered and finally dried at room temperature for 3 h. The dried powder was resuspended in fresh solution and treatment was repeated one more time. The product was washed with 80 mL of hot distilled water (70° C.), and dried at room temperature overnight. The final product was subjected to ion-exchange procedures by mixing 1 g of dried powder in 30 mL of solution containing 2.2 M of $NH_4NO_3$ for 3 h at 80° C. The same procedures were repeated one more time. The final modified HZSM-5 was stirred in solution containing the amount of Fe, Ba or W salt precursor ($Fe(NO_3)_3$ (Example 9a), $Ba(NO_3)_2$ (Example 9b), or $(NH_4)_6H_2W_{12}O_{40}$) (Example 9c) that corresponded to loading range of 0.5-10.0 wt %. The mixture was stirred for 3 h and solvent was removed at 60° C. in a drying oven, dried at 90° C. overnight and calcined at 650° C. for 5 h with heating rate of 3° C./min.

Tables 8 and 9 shows the results of desilicated HZSM-5 as prepared in Example 9a, 9b, and 9c.

TABLE 8

Catalytic cracking of LSRN over metal-containing desilicated HZSM-5 (Si/Al$_2$ = 27) as prepared in Example 9a and 9b

| Metal loading | Metal Aqueous Impregnation onto Desilicated HZSM-5 (Si/Al$_2$ = 27, 0.8M Na$_2$CO$_3$+ 0.05M NaOH, 60° C./2 h) | | | | | | | |
|---|---|---|---|---|---|---|---|---|
| | Ba | | | | Fe | | | |
| (wt %) | 1.0 | 2.0 | 4.0 | 10.0 | 1.0 | 2.0 | 4.0 | 10.0 |
| Mass balance | 101.2 | 101.7 | 96.7 | 102.3 | 96.7 | 101.9 | 98.1 | 101.7 |
| Conversion, % | 75.1 | 79.9 | 74.3 | 71.7 | 81.1 | 73.2 | 73.8 | 66.3 |
| Yields, wt. % | | | | | | | | |
| $C_3^= + C_2^=$ | 46.4 | 47.0 | 46.2 | 44.4 | 45.4 | 43.1 | 44.7 | 40.3 |
| $C_3^=$ | 28.6 | 26.4 | 28.6 | 27.8 | 23.8 | 26.0 | 27.4 | 26.2 |
| $C_2^=$ | 17.8 | 20.6 | 17.6 | 16.6 | 21.6 | 17.0 | 17.3 | 14.2 |
| $C_2^=/C_3^=$ | 0.60 | 0.80 | 0.60 | 0.60 | 0.90 | 0.70 | 0.60 | 0.50 |
| $C_4^=$ | 7.50 | 7.80 | 7.50 | 7.40 | 6.30 | 8.00 | 6.80 | 6.70 |
| BTX | 0.10 | 0.30 | 0.00 | 0.30 | 0.40 | 0.60 | 0.20 | 0.40 |
| $C_1$-$C_4$ alkane | 21.1 | 24.8 | 20.6 | 19.6 | 28.9 | 21.5 | 22.1 | 18.8 |
| $C_1$ | 5.70 | 7.30 | 5.80 | 5.60 | 9.40 | 6.20 | 6.40 | 5.60 |
| $C_2$ | 7.50 | 8.60 | 7.40 | 7.00 | 10.3 | 7.90 | 8.20 | 6.90 |
| $C_3$ | 6.40 | 7.30 | 6.00 | 5.70 | 7.80 | 6.20 | 6.20 | 5.20 |
| $C_4$ | 1.50 | 1.50 | 1.40 | 1.30 | 1.40 | 1.20 | 1.30 | 1.10 |
| $C_5^+$ | 23.8 | 18.8 | 24.5 | 27.2 | 17.1 | 25.4 | 24.6 | 32.0 |
| $C_5$ | 10.5 | 8.3 | 11.6 | 12.2 | 6.40 | 11.0 | 11.0 | 15.7 |
| $C_6$ | 13.3 | 10.4 | 12.9 | 14.9 | 10.6 | 14.3 | 13.5 | 16.2 |
| $C_7$ | 0.00 | 0.00 | 0.00 | 0.00 | 0.00 | 0.00 | 0.00 | 0.00 |
| $H_2$ | 0.70 | 1.00 | 0.70 | 0.70 | 1.40 | 1.00 | 1.20 | 1.20 |
| Selectivity, % | | | | | | | | |
| $C_3^= + C_2^=$ | 61.8 | 58.8 | 62.2 | 62.0 | 56.1 | 58.9 | 60.7 | 60.8 |
| $C_3^=$ | 38.1 | 33.1 | 38.5 | 38.8 | 29.4 | 35.7 | 37.2 | 39.5 |
| $C_2^=$ | 23.7 | 25.8 | 23.7 | 23.2 | 26.7 | 23.2 | 23.4 | 21.3 |
| BTX | 0.10 | 0.40 | 0.00 | 0.40 | 0.60 | 0.80 | 0.30 | 0.60 |

T = 650° C., W.H.S.V. = 4.7-5.2 h$^{-1}$, steam/naphtha ratio = 0.5-0.7, and atmospheric pressure

TABLE 9

Catalytic performance of metal-containing desilicated HZSM-5 (Si/Al$_2$ = 27) as prepared in Example 9c

| Metal loading | Metal Aqueous Impregnation onto Desilicated HZSM-5 (Si/Al$_2$ = 27, 0.8M Na$_2$CO$_3$ + 0.05M NaOH, 60° C./2 h) | | | |
|---|---|---|---|---|
| | W | | | |
| (wt %) | 1.0 | 2.0 | 4.0 | 10.0 |
| Mass balance | 109 | 99.5 | 100 | 99.5 |
| Conversion, % | 80.14 | 77.8 | 73.1 | 72.3 |
| Yields, wt. % | | | | |
| $C_3^= + C_2^=$ | 48.9 | 46.7 | 44.1 | 44.2 |
| $C_3^=$ | 30.4 | 27.7 | 27.0 | 28.1 |
| $C_2^=$ | 18.5 | 19.0 | 17.1 | 16.1 |
| $C_2^=/C_3^=$ | 0.61 | 0.69 | 0.63 | 0.57 |
| $C_4^=$ | 9.35 | 8.41 | 8.60 | 9.12 |
| BTX | 0.15 | 0.16 | 0.15 | 0.16 |
| $C_1$-$C_4$ alkane | 21.8 | 22.5 | 20.2 | 18.8 |
| $C_1$ | 5.98 | 6.51 | 6.08 | 5.54 |
| $C_2$ | 7.91 | 8.08 | 7.31 | 6.93 |
| $C_3$ | 6.41 | 6.53 | 5.60 | 5.15 |
| $C_4$ | 1.46 | 1.40 | 1.24 | 1.18 |
| $C_5^+$ | 18.9 | 21.2 | 26.0 | 26.8 |
| $C_5$ | 8.76 | 9.21 | 11.4 | 13.1 |
| $C_6$ | 10.1 | 12.0 | 14.6 | 13.7 |
| $C_7$ | 0.00 | 0.00 | 0.00 | 0.00 |
| $H_2$ | 0.81 | 0.85 | 0.81 | 0.77 |
| Selectivity, % | | | | |
| $C_3^= + C_2^=$ | 61.0 | 60.1 | 60.3 | 61.2 |
| $C_3^=$ | 37.9 | 35.7 | 37.0 | 38.9 |
| $C_2^=$ | 23.1 | 24.4 | 23.3 | 22.3 |
| BTX | 0.19 | 0.20 | 0.20 | 0.22 |

T = 650° C., W.H.S.V. = 4.7-5.2 h$^{-1}$, steam/naphtha ratio = 0.5-0.7, and atmospheric pressure Example 10: Cracking in the Absence of HZSM-5

For comparison purposes, catalytic cracking (in the presence of steam) of straight run naphtha was carried out over inert materials (quartz beads). The experiments were conducted in a fixed-bed continuous flow reactor system (BTRS-JR® reactor) from Autoclave Engineers. The testing conditions were as follows: weight of catalyst=1.00 g, weight hourly space velocity (WHSV)=grams of reactant, i.e., LSRN injected per hour per gram of catalyst=5.00 h$^{-1}$, steam/naphtha molar ratio=0.6, reaction temperature=650° C., nitrogen flow rate=5.00 mL/min$^{-1}$, duration of the run=6 h.

Table 10 shows the results from Example 10.

TABLE 10

Thermal cracking of LSRN in the absence of catalyst as prepared in Example 10

|  | Thermal Cracking (Quartz beads) |
|---|---|
| Mass balance | 91.31 |
| Conversion, % | 35.41 |
| Yields, wt. % |  |
| $C_3^= + C_2^=$ | 17.7 |
| $C_3^=$ | 10.2 |
| $C_2^=$ | 7.56 |
| $C_2^=/C_3^=$ | 0.74 |
| $C_4^=$ | 6.36 |
| BTX | 1.24 |
| $C_1$-$C_4$ alkane | 10.1 |
| $C_1$ | 3.94 |
| $C_2$ | 2.33 |
| $C_3$ | 0.16 |
| $C_4$ | 3.66 |
| $C_5^+$ | 62.4 |
| $C_5$ | 25.0 |
| $C_6$ | 36.9 |
| $C_7$ | 0.51 |
| $H_2$ | 0.27 |
| Selectivity, % |  |
| $C_3^= + C_2^=$ | 50.0 |
| $C_3^=$ | 28.7 |
| $C_2^=$ | 21.6 |
| BTX | 3.50 |

T = 650° C.,
steam/naphtha ratio = 0.5-0.7, atmospheric pressure

Example 11: Catalyst Stability Studies

Long term stability experiments of pure HZSM-5 (Si/Al$_2$=27), desilicated HZSM-5 (Si/Al$_2$=27), and metal containing HZSM-5(Si/Al$_2$=27) were carried out over several consecutive production-regeneration cycles. Desilication of HZSM-5 corresponds to procedures of 0.8 M Na$_2$CO$_3$+0.05 M NaOH, 2 h at 60° C. The results are summarized in FIG. 1.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of modifying a zeolite catalyst comprising:
providing a zeolite catalyst;
contacting the provided zeolite catalyst with a first composition comprising NaOH and Na$_2$CO$_3$, thereby producing a leached zeolite catalyst, wherein the first composition comprises from greater than 0 to 0.15 M NaOH and from 0.7 to 0.9 M Na$_2$CO$_3$;
contacting the leached zeolite catalyst with a second composition comprising a realuminating agent, thereby producing a realuminated zeolite catalyst, wherein the second composition comprises from 0.5 mmol to 4.0 mmol of Al per gram of leached zeolite catalyst;
contacting the provided zeolite catalyst, the leached zeolite catalyst, or the realuminated zeolite with a third composition comprising TiCl$_4$ or Ti-isopropoxide;
wherein the method produces a modified zeolite catalyst.

2. The method of claim 1, wherein the realuminating agent comprises KAlO$_2$.

3. The method of claim 1, wherein the provided zeolite catalyst comprises HZSM-5.

4. The method of claim 1, wherein the provided zeolite catalyst has a Si/Al$_2$ ratio of 27.

5. The method of claim 1, wherein the first composition comprises 0.01 to 0.05 M NaOH.

6. The method of claim 1, wherein the first composition comprises from 0.01 to 0.03 M NaOH and from 0.75 to 0.85 M Na$_2$CO$_3$.

7. The method of claim 1, wherein the third composition comprises TiCl$_4$.

8. The method of claim 1, wherein the third composition comprises Ti-isopropoxide.

9. The method of claim 1, wherein the metal loading of the modified zeolite catalyst is from 0.5% to 10.0% by weight.

10. The method of claim 1, wherein the method further comprises converting the modified zeolite catalyst into the H-form.

11. A modified zeolite catalyst produced according to the method of claim 1.

12. The modified zeolite catalyst of claim 11, wherein the modified zeolite catalyst produces benzene, toluene, and xylene in combination in an amount of less than 0.8% by weight when the modified zeolite catalyst is contacted with naphtha in a straight run naphtha process, wherein the naphtha comprises 54.7% by weight alkane, 34.2% by weight iso-alkane, 9.6% by weight naphthenes, and 1.5% by weight aromatics.

13. The modified zeolite catalyst of claim 11, wherein modified zeolite catalyst remains active after being contacted with the naphtha in the straight run naphtha process for 6 h.

14. A method of cracking naphtha comprising contacting naphtha with the modified zeolite catalyst of claim 11.

15. The method of claim 14, wherein the method produces ethylene and propylene in combination in a yield of greater than 45%.

16. The method of claim 14, wherein the selectivity of the method for the production of ethylene and propylene in combination is in a yield of greater than 58%.

17. The method of claim 14, wherein the method produces ethylene and propylene in a ratio less than 0.9.

18. The method of claim 14, wherein the method produces benzene, toluene, and xylene in combination in an amount of less than 0.8% by weight when the modified zeolite catalyst is contacted with naphtha in a straight run naphtha process, wherein the naphtha comprises 54.7% by weight alkane, 34.2% by weight iso-alkane, 9.6% by weight naphthenes, and 1.5% by weight aromatics.

19. The method of claim 14, wherein the contacting occurs in the presence of steam.

20. A method of cracking naphtha comprising contacting naphtha with a modified zeolite catalyst produced according to the method of claim 1.

* * * * *